United States Patent
Mastrocola et al.

(10) Patent No.: US 11,946,471 B2
(45) Date of Patent: Apr. 2, 2024

(54) INTEGRATED PUMPS

(71) Applicant: Hamilton Sundstrand Corporation, Charlotte, NC (US)

(72) Inventors: Naison E. Mastrocola, Goshen, CT (US); Adrian L. Stoicescu, Roscoe, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/750,377

(22) Filed: May 22, 2022

(65) Prior Publication Data

US 2023/0374991 A1    Nov. 23, 2023

(51) Int. Cl.
| | |
|---|---|
| *F04D 25/06* | (2006.01) |
| *F04D 5/00* | (2006.01) |
| *F04D 13/06* | (2006.01) |
| *H02K 9/04* | (2006.01) |

(52) U.S. Cl.
CPC ......... *F04D 13/0653* (2013.01); *F04D 5/006* (2013.01); *F04D 5/002* (2013.01); *H02K 9/04* (2013.01)

(58) Field of Classification Search
CPC ...... F04D 13/14; F04D 13/0653; F04D 25/16; F04D 25/06–0666; F04D 23/008; F04D 5/002; H02K 9/04
See application file for complete search history.

(56) References Cited

U.S. PATENT DOCUMENTS

| | | | | |
|---|---|---|---|---|
| 1,794,649 A | * | 3/1931 | Siler ........................ | H02K 9/06 310/57 |
| 1,961,387 A | * | 6/1934 | Pfleger ..................... | H02K 9/06 310/63 |
| 2,074,067 A | * | 3/1937 | Darnell .................... | H02K 9/06 310/52 |
| 2,193,408 A | * | 3/1940 | Knight ..................... | H02K 9/06 310/216.049 |
| 2,429,903 A | * | 10/1947 | Trickey .................... | H02K 9/06 310/60 R |
| 2,515,973 A | * | 7/1950 | Abbott ..................... | H02K 9/08 310/57 |
| 2,528,154 A | * | 10/1950 | Ludwig ............. | H02K 15/0012 29/598 |

(Continued)

FOREIGN PATENT DOCUMENTS

| | | | |
|---|---|---|---|
| DE | 10216619 A1 | 8/2003 | |
| DE | 10317010 A1 * | 11/2004 | ........... F04D 29/086 |

(Continued)

*Primary Examiner* — Thomas Fink
(74) *Attorney, Agent, or Firm* — Locke Lord LLP; Gabrielle L. Gelozin; Joshua L. Jones (57) ABSTRACT

In accordance with at least one aspect of this disclosure, a pump includes a housing having one or more fluid inlets and one or more fluid outlets. The housing is configured to act as a pump housing for passing a fluid from the one or more fluid inlets to the one or more fluid outlets and configured to act as a stator for a motor. The pump also includes a cylinder encased within the housing and mounted on a shaft for rotation within the housing. The cylinder is configured to act as an impeller to drive fluid from the one or more fluid inlets through the housing to the one or more fluid outlets and configured to act as a rotor for the motor.

13 Claims, 5 Drawing Sheets

(56) References Cited

U.S. PATENT DOCUMENTS

| | | | | |
|---|---|---|---|---|
| 2,685,658 A * | 8/1954 | Feiertag | H02K 5/15 | 310/90 |
| 2,777,079 A * | 1/1957 | Egglestone | H02K 9/06 | 310/58 |
| 2,825,827 A * | 3/1958 | Luenberger | H02K 9/06 | 310/60 R |
| 2,842,062 A * | 7/1958 | Wright | F04D 15/0011 | 415/11 |
| 3,075,106 A * | 1/1963 | Chi | H02K 9/00 | 417/372 |
| 3,143,897 A * | 8/1964 | Kohn | H02K 7/1163 | 74/606 R |
| 3,243,617 A * | 3/1966 | Cunningham | H02K 9/06 | 310/68 R |
| 3,250,926 A * | 5/1966 | O'Reilly | H02K 9/06 | 310/59 |
| 3,356,111 A * | 12/1967 | Mitchell | B23B 45/02 | 83/477.1 |
| 3,410,218 A * | 11/1968 | Fivel | F04D 13/06 | 417/350 |
| 3,518,467 A * | 6/1970 | Wightman | H02K 1/24 | 310/63 |
| 3,518,468 A * | 6/1970 | Wightman | H02K 9/06 | 310/410 |
| 5,295,784 A * | 3/1994 | Grotz | F04D 23/008 | 415/59.1 |
| 5,551,842 A * | 9/1996 | Schmid | F02M 37/048 | 415/55.1 |
| 6,280,157 B1 * | 8/2001 | Cooper | F04D 5/006 | 417/423.7 |
| 7,232,292 B2 | 6/2007 | Lopatinsky et al. | | |
| 2012/0328460 A1 * | 12/2012 | Horvath | A61M 60/546 | 417/420 |

FOREIGN PATENT DOCUMENTS

| | | | |
|---|---|---|---|
| EP | 1227247 B1 | 10/2008 | |
| GB | 2036870 A * | 7/1980 | F04D 23/008 |

\* cited by examiner

INTEGRATED PUMPS

TECHNICAL FIELD

The present disclosure relates to pumps, and more particularly to integrated pumps, e.g., for use in an aircraft fuel system.

BACKGROUND

Certain pumps may include an electric motor coupled thereto. However, electric motors can be very heavy, therefore it is necessary to consider the weight tradeoff between a gearbox used to drive a pump with rotational power from an engine, for example, and the electric motor. There remains a need in the art for improvements to pump systems, such as in the aerospace industry, that allow for integration of electric motors into existing pumps but that address weight, cost, space considerations more efficiently than conventional electrically driven pumps. This disclosure provides a solution for this need.

SUMMARY

In accordance with at least one aspect of this disclosure, a pump includes a housing having one or more fluid inlets and one or more fluid outlets. The housing is configured to act as a pump housing for passing a fluid from the one or more fluid inlets to the one or more fluid outlets and configured to act as a stator for a motor. The pump also includes a cylinder encased within the housing and mounted on a shaft for rotation within the housing. The cylinder is configured to act as an impeller to drive fluid from the one or more fluid inlets through the housing to the one or more fluid outlets and configured to act as a rotor for the motor.

In embodiments, the one or more fluid inlets and one or more fluid outlets can be spaced from one another along an outer diameter of the housing in a circumferential direction to form one or more circumferential passes within the housing.

In embodiments, a first housing portion can include one or more field windings configured to generate a magnetic field to drive rotation of the cylinder. In such embodiments, the first housing portion can be configured to act as the stator for the motor. In certain embodiments, only the first housing portion includes electrical components for the housing to act as a stator. In embodiments, the first housing portion and a second housing portion together can be configured to act as the pump housing to pass the fluid from the fluid inlet to the fluid outlet.

In embodiments, the one or more fluid inlets can include two fluid inlets and the one or more fluid outlets can include two fluid outlets. One fluid inlet and one fluid outlet can be positioned on first side of the second housing portion. Additionally, one fluid inlet and one fluid outlet can be positioned on a second side of the second housing portion, opposite the first side and across the first housing portion. In embodiments, a fluid channel formed by the fluid inlet and the fluid outlet on the first side of the second housing portion can be in fluid communication with a fluid channel formed by the fluid inlet and the fluid outlet on the second side of the second housing portion via a clearance. In certain embodiments, the fluid passing though the housing and the clearance can be configured to act as coolant for the motor. The clearance can be formed radially between an outer diameter of the first cylinder portion and an inner diameter of the first housing portion. In certain embodiments, only the second housing portion can form the pump housing.

In embodiments, the cylinder can include a first cylinder portion and a second cylinder portion. The first cylinder portion can be bound by the second cylinder portion along the rotational axis of the cylinder such that the first cylinder portion and the second cylinder portion are configured to rotate together. In certain such embodiments, the pump and the motor are configured to act in parallel and simultaneously, where the motor drives the pump.

In embodiments, the first cylinder portion can include one or more rotor poles configured to be driven by a magnetic field generated by the first housing portion such that the first cylinder portion is configured to act as the rotor for the electrical machine. In certain embodiments, only the first cylinder portion includes the electrical components needed for cylinder to act as the rotor. In embodiments, the second cylinder portion can include one or more blades configured to induce turbulence in a fluid passing from the one or more fluid inlets to the one or more fluid outlets, for example the second cylinder portion can include an impeller.

In certain embodiments, the cylinder can include a rotor portion sandwiched between two impeller portions. The impeller portions can be configured to induce one or more radial vortex passes in a fluid passing though the one or more circumferential passes to increase a pressure of the fluid at the fluid outlet. In embodiments, the first cylinder portion, the rotor portion, and the first housing portion, the stator portion, can have the same axial length. The second cylinder portion, the impeller portion(s) can extend axially beyond the first housing portion, the stator portion.

One or more bearings can be disposed on the shaft configured to interface between the shaft and the second housing portion to reduce rotational friction between the shaft and the second housing portion. In certain embodiments, the pump can be or include a regenerative pump. In certain embodiments, at least a portion of the cylinder can be or include a regenerative impeller wheel. In certain embodiments, the motor can include a switched reluctance motor.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
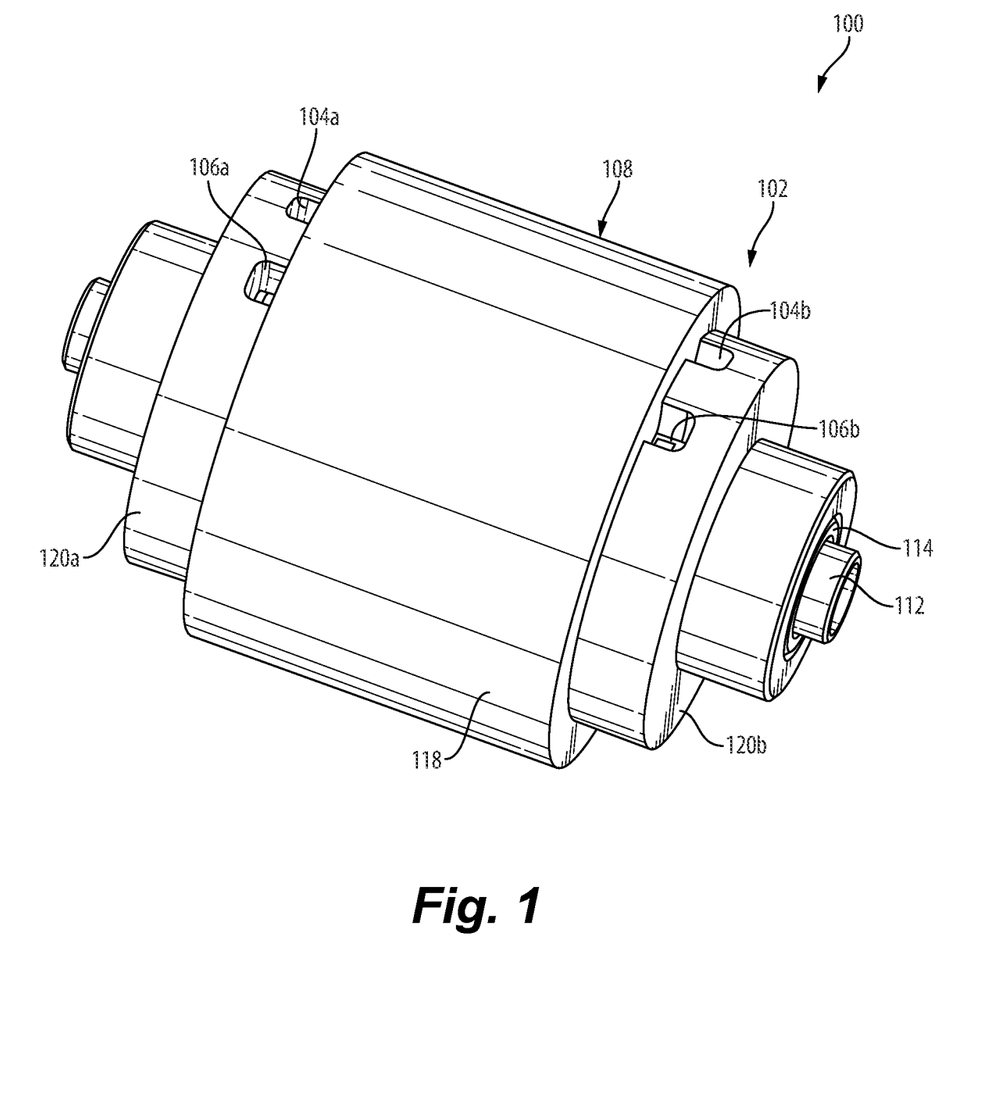
FIG. 1 is a perspective view of a pump in accordance with this disclosure, showing a housing.

Reference will now be made to the drawings wherein like reference numerals identify similar structural features or aspects of the subject disclosure. For purposes of explanation and illustration, and not limitation, an illustrative view of an embodiment of a pump in accordance with the disclosure is shown in FIG. 1 and is designated generally by reference character 100. Other embodiments and/or aspects of this disclosure are shown in FIGS. 2-5.

Figure 2:
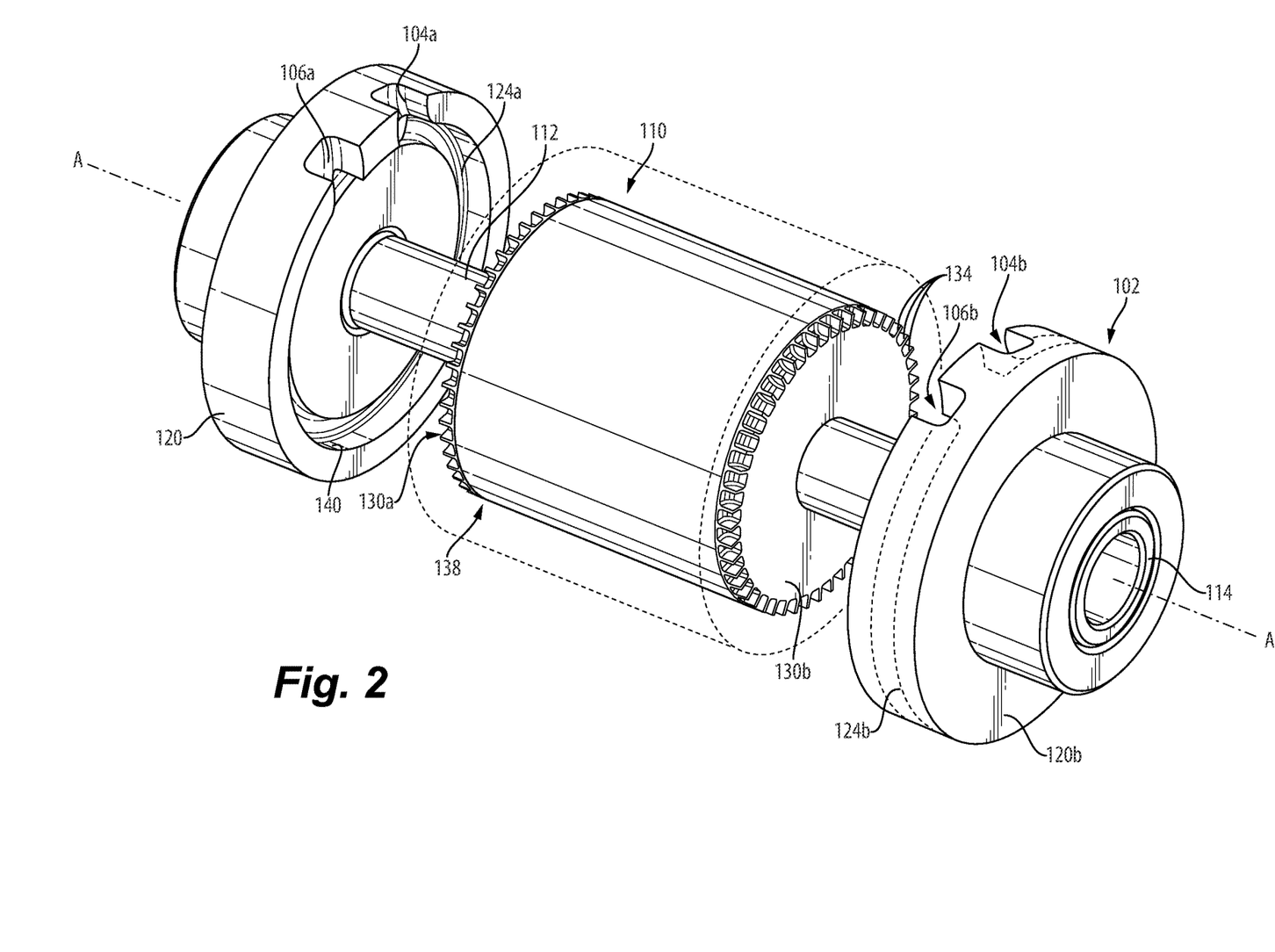
FIG. 2 is an exploded perspective view of the pump of FIG. 1, showing one or more housing portions and one or more cylinder portions.

In accordance with at least one aspect of this disclosure, as shown in FIGS. 1 and 2, a pump 100 (e.g., a regenerative pump) can include a housing 102 having one or more fluid inlets 104 and one or more fluid outlets 106. The housing 102 can be configured to act as both a pump housing for passing a fluid from the one or more fluid inlets 104 to the one or more fluid outlets 106 and configured to act as a stator for a motor 108 (e.g., a switched reluctance motor). The pump 100 can also include a cylinder 110 encased within the housing 102 and mounted on a shaft 112 for rotation within the housing. The cylinder 110 can be configured to act as both an impeller to drive fluid from the one or more fluid inlets 104 through the housing 102 to the one or more fluid outlets 106 and configured to act as a rotor for the motor 108. One or more bearings 114 can be disposed on the shaft 112 configured to interface between the shaft 112 and the housing to reduce rotational friction between the shaft 112 and the housing 102.

In certain embodiments, the housing 102 can include a first housing portion 118 and a second housing portion 120. In FIG. 2, the first housing portion 118 is shown in phantom. In embodiments, the one or more fluid inlets 104 can include two fluid inlets 104a, 104b and the one or more fluid outlets 106 can include two fluid outlets 106a, 106b. One fluid inlet 104a and one fluid outlet 106a can be positioned on first side 120a of the second housing portion 120. Additionally, one fluid inlet 104b and one fluid outlet 106b can be positioned on a second side 120b of the second housing portion 120, opposite the first side 120a and across the first housing portion 118.

The first housing portion 118 can be configured to act as the stator of the motor 108 and can include one or more field windings 122 configured to generate a magnetic field to drive rotation of the cylinder 110. In certain embodiments, only the first housing portion 118 includes electrical components needed for the housing 102 as a whole to act as a stator. The second housing portion 120 can include one or more fluid channels 124 configured to form one or more plena 126 when coupled to the second housing portion 118. Because the plena 124 are formed by the coming together of the two housing portions 118, 120, the first housing portion 118 and the second housing portion 120 together can be configured to act as the pump housing 102 to pass the fluid from the fluid inlet 104 to the fluid outlet 106. As shown, the first housing portion 118 can be bookended by first and second sides 120a, 120b of the second housing portion 120. One or more additional housing portions can be included as needed, for example an outer housing portion configured to enclose both first and second housing portions 118, 120, though the additional housing portions are not shown.

Still with reference to FIG. 2, the cylinder 110 can include a first cylinder portion 128 and a second cylinder portion 130. The first cylinder portion 128 can be bound on either or both sides by the second cylinder portion 130a, 130b along the rotational axis A of the cylinder 110 such that the first cylinder portion 128 and the second cylinder portion 130 are configured to rotate together. For example, in certain embodiments, the cylinder 110 can include a rotor portion 128 sandwiched between two impeller portions 130a, 130b so that the pump 100 and the motor 108 are driven in parallel and simultaneously.

The first cylinder portion, e.g., the rotor portion, can include one or more rotor poles 132 configured to be driven by the magnetic field generated by the first housing portion 118 such that the first cylinder portion 128 is configured to act as the rotor for the motor 108. For example, in embodiments, only the first cylinder portion 128 can include the electrical components needed for cylinder 110 to act as the rotor. The second cylinder portion 130 can include one or more blades 134 configured to induce turbulence in a fluid passing from the one or more fluid inlets 104 to the one or more fluid outlets 106. For example, at least a portion of the second cylinder portion 130 can be or include a regenerative impeller wheel.

Figure 3:
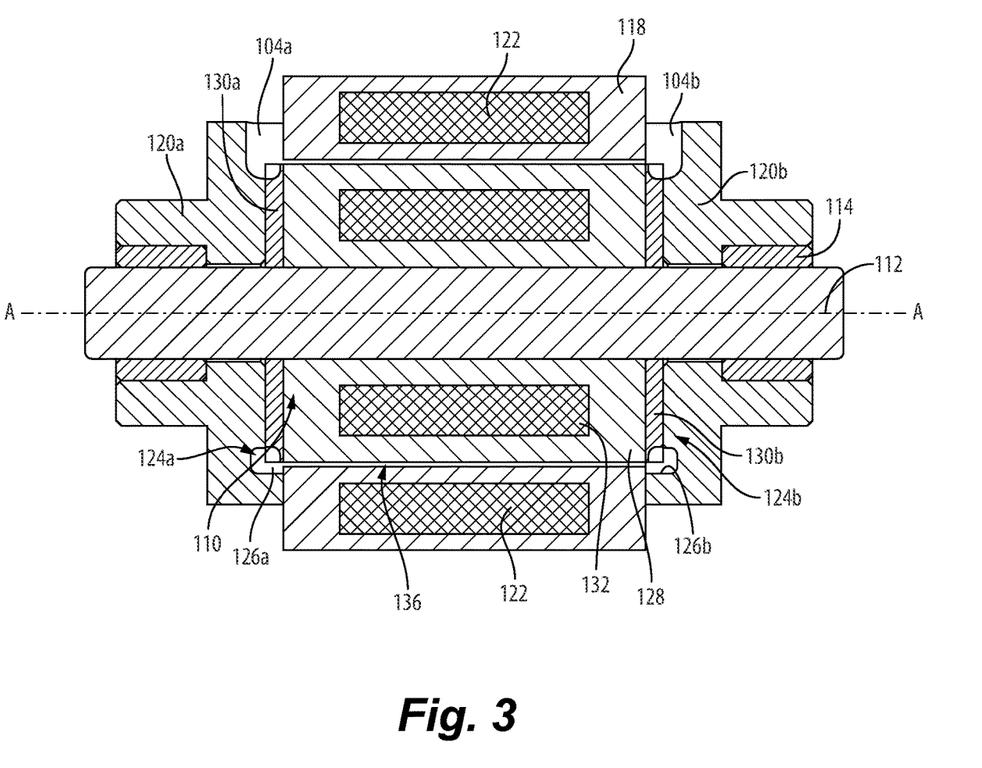
FIG. 3 is a side cross sectional view of the pump of FIG. 1.

As shown in FIG. 3, the first cylinder portion 128 (e.g., the rotor portion), and the first housing portion 118 (e.g., the stator portion) can have the same axial length. The second cylinder portion 130, the impeller portion(s), can extend axially beyond the first housing portion 118. The fluid channel 124a, and/or the plena 126a formed by the fluid inlet 104a and the fluid outlet 106a on the first side 120a of the second housing portion 120 can be in fluid communication with a fluid channel 124b and/or a plena 126b formed by the fluid inlet 104b and the fluid outlet 106b on the second side 120b of the second housing portion 120 via a clearance 136. The clearance can 136 be formed radially between an outer diameter 138 of the first cylinder portion 128 and an inner diameter 140 of the first housing portion 118. In embodiments, the motor 108 can be a wet rotor motor where fluid passing though the housing 102 and the clearance 136 can be configured to act as coolant for the motor 108.

Figure 4:
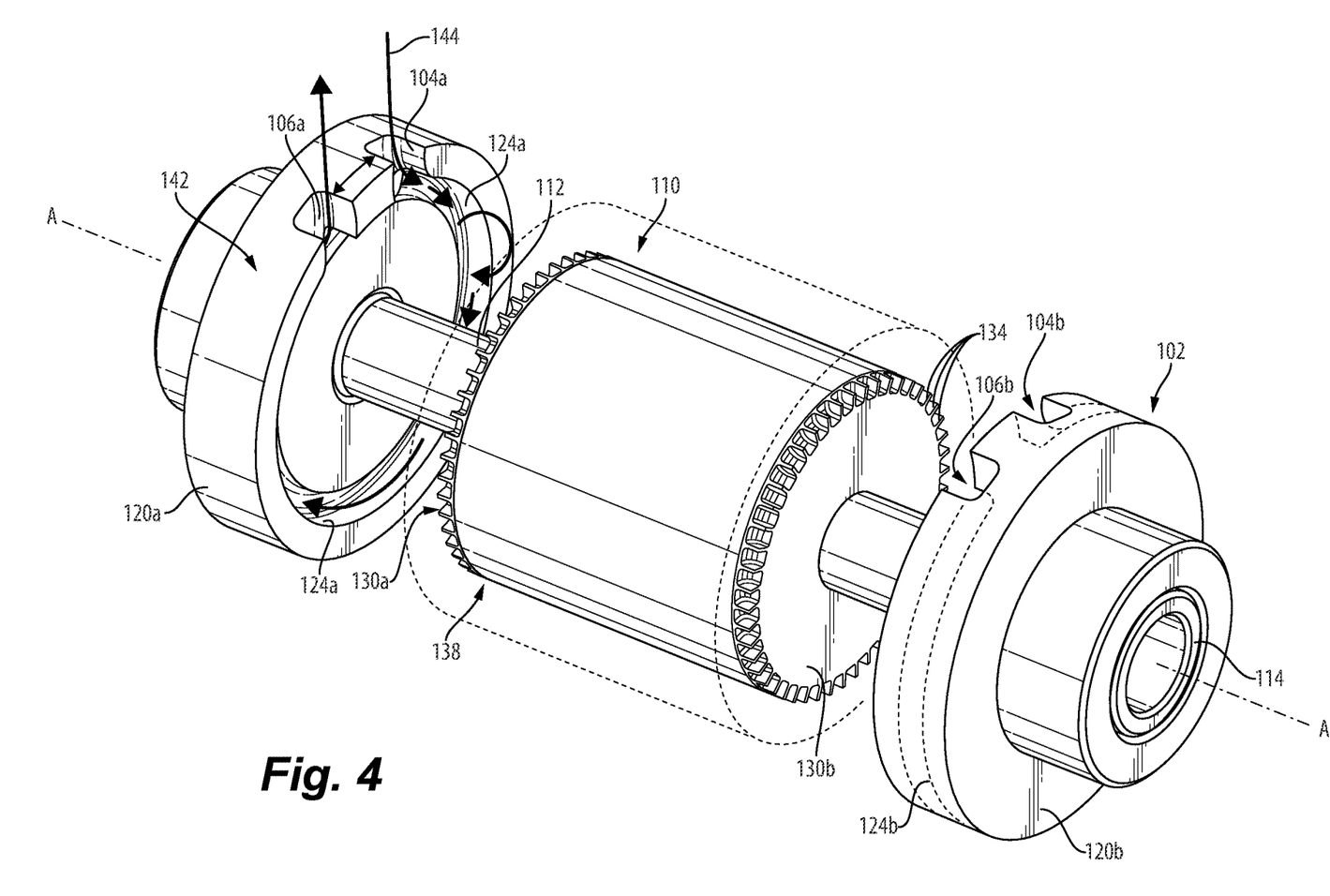
FIG. 4 is an exploded perspective view of the pump of FIG. 1, showing a fluid path through the one or more housing portions.
Figure 5:
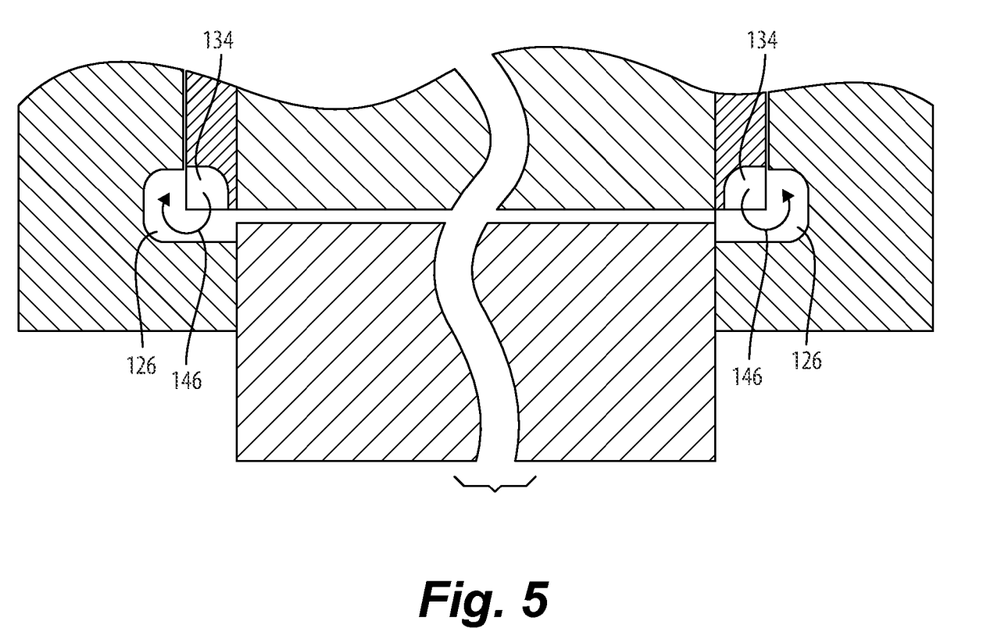
FIG. 5 is an enlarged partial view of FIG. 3, showing a flow pattern of fluid through the one or more housing portions.

With reference now to FIG. 4, the one or more fluid inlets 104 and one or more fluid outlets 106 can be spaced from one another along an outer diameter 142 of the housing in a circumferential direction to form one or more circumferential passes 144 within the housing 102. As can be seen more clearly in FIG. 5, the impeller portions 130 of the cylinder 110 can be configured to induce one or more radial vortex passes 146 in the fluid passing though the one or more circumferential passes 144 to increase a pressure of the fluid at the fluid outlet 106. With each pass, kinetic energy is added to the fluid stream by the blades 134, which translates to an increase of the pump discharge pressure. The radial vortex passes 144 can occur within the plena 126 formed by the coming together of the two housing portions 118, 120, as shown.

Embodiments can include a regenerative pump wheel having vanes which closely resemble the rotor teeth of a switched reluctance rotor. Certain design variations to the pump, for example as described herein, allow for the integration of an electric motor rotor where the pump wheel becomes an electric motor coupling device in a stator field. These design variations and integration of the electric motor rotor do not impact pump performance. In embodiments, integration of the pump wheel and the motor rotor can provide a significant weight, cost, and envelop reduction. Therefore, embodiments of the pump provided herein can be favorably than a standalone pump/motor combination. Additionally, because the impeller portion is split into two mirror image pumping elements, the resulting two regen pumping elements produce the same pumping action, which can further increase pressure at the discharge outlet. While embodiments are described with respect to regenerative pumps and switched reluctance motors, it is contemplated that any suitable pump and motor design can be used. For example other vane pumps, motors having an open loop commutation, or a permanent magnet rotor may be used or included. It should be appreciated by those skilled in the art that variations in design may occur if integrating certain pump types with certain motors, however the principle as described herein should remain the same.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A pump, comprising:
    a housing having one or more fluid inlets and one or more fluid outlets configured to act as a pump housing for passing a fluid from the one or more fluid inlets to the one or more fluid outlets, and configured to act as a stator for a motor, wherein the one or more fluid inlets and one or more fluid outlets are defined in an outer diameter in a radially outward facing circumferential surface of the housing spaced from one another in a circumferential direction to form one or more circumferential passes within the housing; and
    a cylinder encased within the housing and mounted on a shaft for rotation within the housing, the cylinder configured to act as an impeller to drive fluid from the one or more fluid inlets through the housing to the one or more fluid outlets, and configured to act as a rotor for the motor,
    wherein the cylinder includes a first cylinder portion and a second cylinder portion, wherein the first cylinder portion is bound by the second cylinder portion along the rotational axis of the cylinder, wherein the housing includes a first housing portion and a second housing portion, wherein one or more fluid inlets and one or more fluid outlets are defined in the second housing portion, wherein the first cylinder portion and the first housing portion are the same axial length, wherein the second cylinder portion extends axially beyond the first housing portion, wherein the second cylinder portion includes a first sub portion and a second sub portion, wherein the first sub portion is positioned separate from the second sub portion axially across the first cylinder portion, wherein the first sub portion and the second sub portions are mirror images of one another, wherein the pump includes a regenerative pump,
    wherein the first housing portion includes one or more field windings configured to generate a magnetic field to drive rotation of the cylinder such that the first housing portion is configured to act as the stator for the motor,
    wherein the one or more fluid inlets includes two fluid inlets and the one or more fluid outlets includes two fluid outlets and wherein one fluid inlet and one fluid outlet are positioned on a first side of the second housing portion and one fluid inlet and one fluid outlet are positioned on a second side of the second housing portion, opposite the first side and across the first housing portion, wherein the second housing portion forms the pump housing,
    wherein a first fluid channel is formed by the fluid inlet and the fluid outlet on the first side of the second housing portion and wherein a second fluid channel is formed by the fluid inlet and the fluid outlet on the second side of the second housing portion, wherein the fluid inlet and the fluid outlet of the first fluid channel are separated from one another by a first jetty in the first fluid channel to prevent fluid in the first fluid channel from exiting through the fluid inlet, and wherein the fluid inlet and the fluid outlet of the second fluid channel are separated from one another by a second jetty in the second fluid channel to prevent fluid in the second fluid channel from exiting through the fluid inlet.

2. The pump of claim 1, wherein the first housing portion and the second housing portion together are configured to act as the pump housing to pass the fluid from the fluid inlet to the fluid outlet.

3. The pump of claim 1, wherein a fluid channel formed by the fluid inlet and the fluid outlet on the first side of the second housing portion is in fluid communication with a fluid channel formed by the fluid inlet and the fluid outlet on the second side of the second housing portion via a clearance.

4. The pump of claim 3, wherein the clearance is formed radially between an outer diameter of the first cylinder portion and an inner diameter of the first housing portion.

5. The pump of claim 1, wherein the first cylinder portion and the second cylinder portion are configured to rotate together.

6. The pump of claim 1, wherein the first cylinder portion includes one or more rotor poles configured to be driven by a magnetic field generated by the first housing portion such that the first cylinder portion is configured to act as the rotor for the motor.

7. The pump of claim 5, wherein the second cylinder portion includes one or more blades configured to induce turbulence in a fluid passing from the one or more fluid inlets to the one or more fluid outlets.

8. The pump of claim 7, wherein the second cylinder portion includes an impeller.

9. The pump of claim 1, further comprising one or more bearings disposed on the shaft configured to interface between the shaft and the second housing portion to reduce rotational friction between the shaft and the second housing portion.

10. The pump of claim 1, wherein the cylinder includes a rotor portion sandwiched between two impeller portions, wherein the impeller portions are configured to induce one or more radial vortex passes in a fluid passing though the one or more circumferential passes to increase a pressure of the fluid at the fluid outlet.

11. The pump of claim 1, wherein at least a portion of the cylinder includes a regenerative impeller wheel.

12. The pump of claim 1, wherein the motor includes a switched reluctance motor.

13. The pump of claim 1, wherein the pump is configured receive the fluid at the one or more fluid inlets at a first pressure and pump the fluid out of the housing through the one or more fluid outlets at a second pressure higher than the first pressure during rotation of the cylinder relative the first housing portion.

* * * * *